Figure 1:
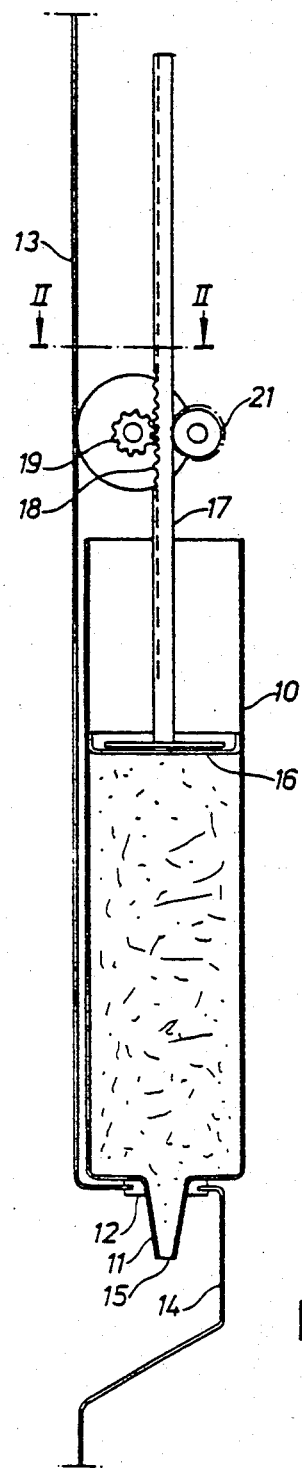

United States Patent [19]

Eknor

[11] Patent Number: 4,516,696
[45] Date of Patent: May 14, 1985

[54] AUTOMATIC DISPENSER FOR A DETERGENT

[75] Inventor: Per O. E. Eknor, Huskvarna, Sweden

[73] Assignee: Aktiebolaget Electrolux, Stockholm, Sweden

[21] Appl. No.: 578,988

[22] PCT Filed: Aug. 10, 1981

[86] PCT No.: PCT/SE81/00225
§ 371 Date: Apr. 16, 1982
§ 102(e) Date: Apr. 16, 1982

[87] PCT Pub. No.: WO82/00753
PCT Pub. Date: Mar. 18, 1982

Related U.S. Application Data

[63] Continuation of Ser. No. 375,031, Apr. 16, 1982, abandoned.

[30] Foreign Application Priority Data

Aug. 28, 1980 [SE] Sweden ................................ 8006035

[51] Int. Cl.³ ............................................. B67D 5/06
[52] U.S. Cl. .................................... 222/181; 222/326; 222/333; 222/386; 74/422
[58] Field of Search ............... 222/325, 326, 333, 386, 222/651, 180, 181, 185, 327, 409; 74/89.17, 422

[56] References Cited

U.S. PATENT DOCUMENTS

| | | | |
|---|---|---|---|
| 358,162 | 2/1887 | Miller | 222/372 X |
| 679,983 | 8/1901 | O'Neil | 222/326 X |
| 2,859,628 | 11/1958 | Arko | 74/422 X |
| 3,107,824 | 10/1963 | Perl | 222/207 |
| 3,207,373 | 9/1965 | Dannenmann | 222/651 |
| 3,687,339 | 8/1972 | Dessureault | 222/183 |
| 3,854,629 | 12/1974 | Blieberger | 222/109 |

FOREIGN PATENT DOCUMENTS 166690  3/1934  Switzerland ....................... 222/333

Primary Examiner—Joseph J. Rolla
Assistant Examiner—Michael S. Huppert
Attorney, Agent, or Firm—Alfred E. Miller

[57] ABSTRACT

Automatic dispenser for a detergent in the form of a paste in a dish or laundry washing machine. The inventive device generally comprises a cartridge-container of common type and a feeding device comprising a motor driven piston rod and a piston. The assembly is positioned in a suitable location in the machine, for example in its door. To facilitate exchange of the cartridge, the piston rod is easily removable by means of a support wheel which can be swung out and which is kept in working position by a resilient latch. The quantity of the portion is controlled by a current pulse from the program control device of the machine.

4 Claims, 2 Drawing Figures

U.S. Patent

May 14, 1985

4,516,696

AUTOMATIC DISPENSER FOR A DETERGENT

This application is a continuation of application Ser. No. 375,031, filed 4/16/82 now abandoned.

This invention relates to an automatic dispenser for a detergent in the form of a paste in a dish or laundry washing machine.

Hitherto, as a rule manual dispensing devices for the detergent have been used in dish and laundry washing machines, the detergent being put into some kind of pocket in the wet cabinet of the machine. Lately, however, automatic dispensers for dishwashing powder have been presented, the powder being kept in a supply well separated from the web cabinet. However, granular detergents tend to form clumps and clog the dispensers. One way of avoiding this inconvenience is instead to use a detergent in the form of a paste. Such a substance, however, calls for special means for feeding and dispensing. The present invention presents a solution to the problem of dispensing a detergent paste in a dish or laundry washing machine.

The invention provides a device in which the paste is supplied from a container by a motor driven device by means of which the container after a plurality of portions have been fed out is completely emptied and either replaced by a new one or filled with fresh paste. Detergents in this form are insusceptible to moisture and can by means of such a device be dispensed without interruptions in given portions, which are determined by adjusting the operating intervals of the motor driven device. The properties of the device according to this invention are defined by the characteristics of claim 1.

Figure 2:
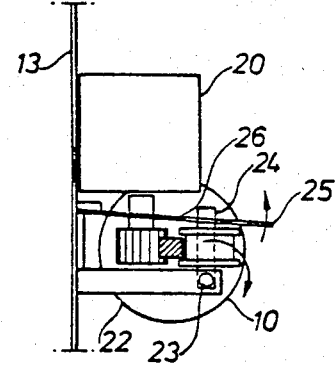

An embodiment of the dispenser will be described in the following with reference to the accompanying drawing, which in FIG. 1 shows a vertical cross section of the dispenser and in FIG. 2 shows the driving means of the device in a horizontal cross section on the line II—II of FIG. 1.

The dispensing means is located in an interspace of a wall of the wet cabinet of the machine, preferably in its door. A supply of detergent paste for dish or laundry washing is contained in a tube or a cartridge 10 with a neck 11 at its lower end projecting into the wet cabinet through an opening 12 in the inner wall 13 of the door which in this part has a bulge 14. At the end of the neck is a hole 15 through which paste is fed. The upper end of the tube is open so as to receive a piston 16 with a rod 17. The piston rod has teeth 18 coacting with a drive wheel 19 on the shaft of an electric motor 20. To ensure engagement between teeth and drive wheel a support wheel 21 is placed at that side of the rod which is opposite to the teeth. The motor and the support wheel are fastened to a bracket 22 secured to the inner wall 13 of the door. The support wheel is pivotable out from the rod by the aid of a hinge 23 between the shaft 24 of the wheel and the bracket. The latter also supports a leaf spring 25 with a hole 26 into which the free end of the shaft projects when the wheel is in working position (shown). By removing the spring from the shaft the wheel is disengaged and hence also the rod will be clear of the drive wheel 19.

When a tube 10 is to be inserted into the device the interior wall 13 is uncovered, which can be done by removing a part of the door. The support wheel is swung out, as described in the foregoing, and the rod is removed. A tube is placed vertically with the neck in the opening 12 and the piston 16 in the upper opening. The teeth are turned towards the drive wheel and the support wheel is swung in and secured by means of the spring 25, after which the motor can move the piston downwards in the tube.

The motor is supplied with current from a program control device (not shown) which gives an impulse at an interval in the program of the machine at which the detergent is to be added. Each impulse moves the piston about one tooth forwards which corresponds to a portion of the detergent fed to the wet cabinet. The quantity of the portion can be controlled by making the impulse last for a shorter or a longer time.

The embodiment described is an example of one manner of realising the invention. In other embodiments the tube can be orientated in directions other than the one shown here, and other means can be substituted for the transmission of movement from motor to piston without departing from the basic idea of the invention.

I claim:

1. A device mounted on a wall adjacent a wet cabinet of a laundry or dishwashing machine for automatic apportioning and dispensing of a detergent in the form of a paste to the wet cabinet, comprising a container having a discharge hole and provided with a supply of said paste, and apportioning and dispensing means for transferring a portion of said paste from said container through said discharge hole to said wet cabinet of the machine, said apportioning and dispensing means further comprising a piston provided with a rod inserted in said container, a motor and movement transmitting means, said rod being connected to said motor through said transmitting means, said piston rod further being provided with teeth engaging with a part of said movement transmitting means in the form of a drive wheel, a support idle wheel engaging the piston rod on the side opposite the toothed side wherein means are provided for pivotally mounting the support idle wheel to be moved into and out of engagement with said piston rod, a locking device being provided for releasably locking said support idle wheel in a position of engagement with said piston rod, said support idle wheel mounting means being operable to move said wheel to a position permitting the removal of said container and piston together with the piston rod from said wall.

2. A device as claimed in claim 1 wherein said locking device comprises a leaf spring having a hole, the support idle wheel being mounted on a shaft, one end of which being pivotally mounted and the opposite end of which engages with said hole when said support idle wheel engages with said piston rod.

3. A device as claimed in claim 2 further comprising a bracket, and the motor and movement transmitting means being mounted in a space separated from said wet cabinet and secured by means of said bracket on a wall bounding said space.

4. A device as claimed in claim 3 wherein the container is positioned in said space and its discharge end passes through an opening in said wall.

* * * * *